( 12 ) United States Patent
Eatough et al.

(10) Patent No.: US 7,193,974 B2
(45) Date of Patent: Mar. 20, 2007

(54) METHOD AND APPARATUS FOR DYNAMICALLY DISCOVERING ALIAS DOMAINS

(75) Inventors: David A. Eatough, Herriman, UT (US); Gregory P. Olsen, Lindon, UT (US)

(73) Assignee: Intel Corporation, Santa Clara, CA (US)

( * ) Notice: Subject to any disclaimer, the term of this patent is extended or adjusted under 35 U.S.C. 154(b) by 1024 days.

(21) Appl. No.: 09/927,708

(22) Filed: Aug. 10, 2001

(65) Prior Publication Data

US 2003/0039215 A1 Feb. 27, 2003

(51) Int. Cl.
H04L 12/28 (2006.01)
H04L 12/56 (2006.01)
H04J 3/26 (2006.01)

(52) U.S. Cl. .................. 370/254; 370/390; 370/432
(58) Field of Classification Search ............... 370/254, 370/255, 390, 432
See application file for complete search history.

(56) References Cited

U.S. PATENT DOCUMENTS 5,361,256 A * 11/1994 Doeringer et al. .......... 370/390
6,122,275 A * 9/2000 Karol et al. ................. 370/389
6,181,697 B1 * 1/2001 Nurenberg et al. ......... 370/390
6,189,039 B1 * 2/2001 Harvey et al. .............. 709/232
6,496,859 B2 * 12/2002 Roy et al. ................... 709/223
6,735,200 B1 * 5/2004 Novaes ....................... 370/390

OTHER PUBLICATIONS

S. Keshav, An Engineering Approach to Computer Networking ATM Networks, the Internet, and the Telephone Network, Apr. 1997, pp. 203-204 and 329-334, Addison Wesley Longman, Inc.
U.S. Appl. No. 09/438,402, filed Nov. 12, 1999, entitled "Method and System for Distributing Multicast Data", Inventor: Gregory Olsen (Intel Matter No. P7501).

* cited by examiner

Primary Examiner—Huy D. Vu
Assistant Examiner—Daniel J. Ryman
(74) Attorney, Agent, or Firm—Blakely, Sokoloff, Taylor & Zafman LLP

(57) ABSTRACT

A method and apparatus for dynamically discovering alias domains is described. A method comprises dynamically discovering a set of subnets, the set of subnets having visibility of a transmission and selecting a network element to perform the transmission, the network element being in one of the set of subnets.

23 Claims, 10 Drawing Sheets

METHOD AND APPARATUS FOR DYNAMICALLY DISCOVERING ALIAS DOMAINS

NOTICE OF RELATED APPLICATION

This application is related to U.S. patent application Ser. No. 09/438,402 entitled "Method and System for Distributing Multicast Data" filed on Nov. 12, 1999, by Gregory Olsen.

BACKGROUND OF THE INVENTION

1. Field of the Invention

The invention relates to the field of communications. More specifically, the invention relates to communications over networks.

2. Background of the Invention

Data can be transmitted to multiple clients in a network by broadcasting the data, multicasting the data, or unicasting the data to each client. Unicasting the data to each client involves addressing the data to each client and transmitting the data repeatedly for each client. Broadcasting involves transmitting data to a broadcast address (e.g., 255.255.255.255) to be received by all clients in the network. Multicasting involves transmitting data to a predefined multicast address to be received by the clients in the network configured to listen for data transmitted to the multicast address. In addition, all routers and switches throughout the network are configured to forward or block broadcasting or multicasting.

Unicasting the data to each client unnecessarily consumes bandwidth. The amount of wasted bandwidth increases proportionally with the size of the data and the number of clients. Moreover, the time required to unicast a large amount of data to a large number of clients is prohibitive. Attempts to broadcast or multicast the data can be frustrated by network configurations chosen by network administrators. A network administrator can configure their routers and/or switches not to support broadcast or multicast or limit the amount of support across their network because of the potential for broadcast and/or multicast storms.

SUMMARY OF THE INVENTION

An embodiment of the invention is a method for discovering alias domains. A set of subnets are discovered, where these subnets have visibility of a transmission. A network element in one of the subnets is selected to perform the transmission. A transmission job identifier is sent to the network element. This identifier will be included in the transmission that is to be performed by the network element. In addition, the transmission will include the address of the network element's subnet. An indication from the network element is received that it is aware of an alias domain representative being in another one of the subnets. Other embodiments are also described and claimed.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE FIGURES

In the following description, numerous specific details are set forth to provide a thorough understanding of the invention. However, it is understood that the invention may be practiced without these specific details. In other instances, well-known circuits, structures, protocols and techniques have not been shown in detail in order not to obscure the invention. Although the invention is described with reference to multicast jobs, the invention can be applied to broadcast jobs, point to multipoint, and multipoint to multipoint.

Figure 1A:
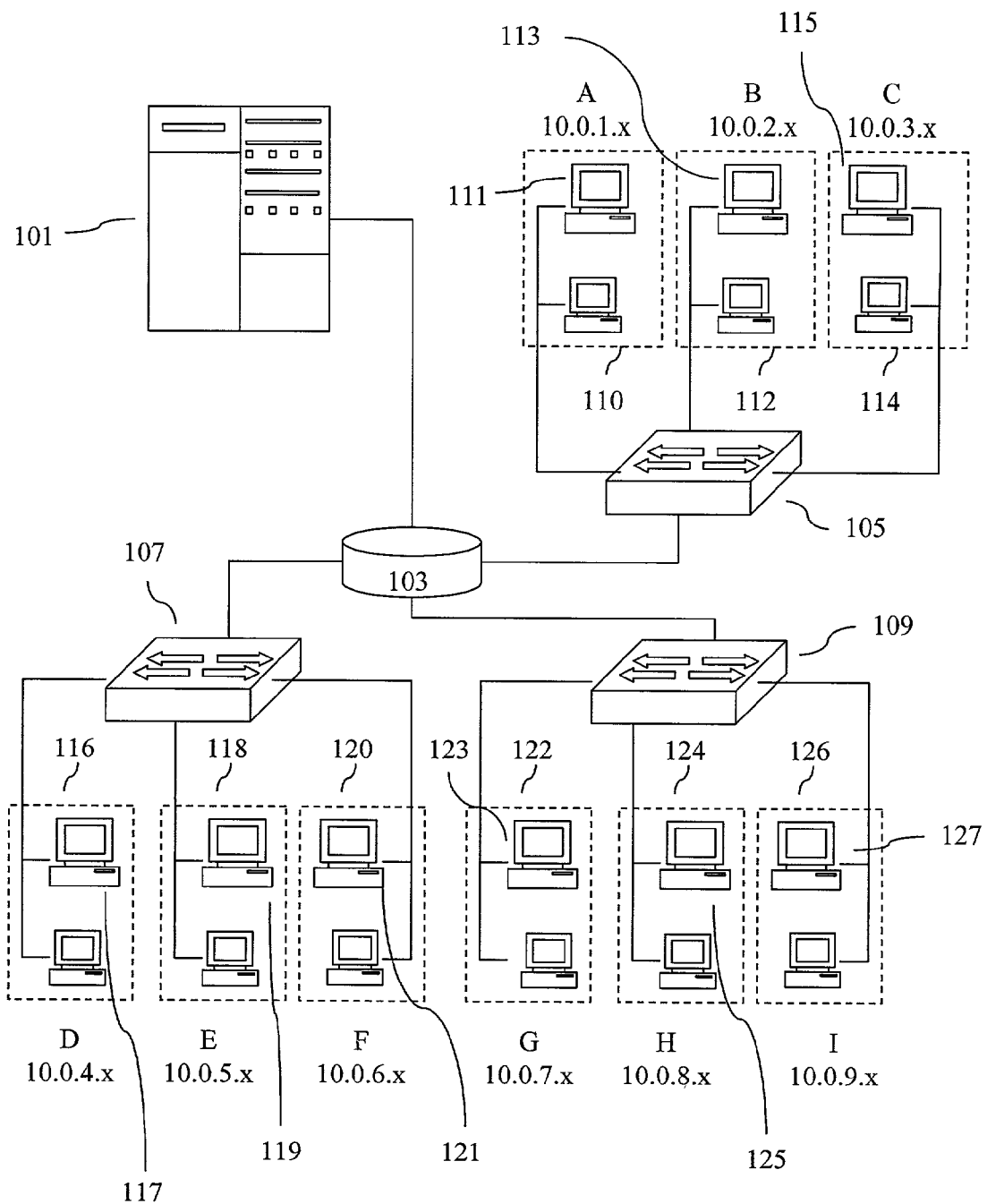
FIG. 1A is an exemplary block diagram illustrating establishment of alias domains according to one embodiment of the invention.

FIG. 1A is an exemplary block diagram illustrating establishment of alias domains according to one embodiment of the invention. In FIG. 1A, a core server 101 connects to a router 103. In this example, the router 103 does not forward multicast traffic. The router 103 is connected to three switches: 105, 107 and 109. The switch 105 connects to three subnets 110, 112, and 114. The switch 107 connects to three subnets 116, 118, and 120. The switch 109 connects to three subnets 122, 124, and 126. The switches 105, 107, and 109 forward multicast traffic. The network elements 111, 113, and 115 respectively are the subnet representatives for the subnets 110, 112, and 114. The network elements 117, 119, and 121 respectively are the subnet representatives for the subnets 116, 118, and 120. Network elements 123, 125 and 127 respectively are the subnet representatives for the subnets 122, 124, and 126. In this example, all subnets are to receive multicast data. The core server 101 determines the subnets to receive the multicast data. The list of subnets are identified in Table 1.

TABLE 1

| ADDRESS | SUBNET |
| --- | --- |
| 10.0.1.255 | A |
| 10.0.2.255 | B |
| 10.0.3.255 | C |
| 10.0.4.255 | D |
| 10.0.5.255 | E |

TABLE 1-continued

| ADDRESS | SUBNET |
| --- | --- |
| 10.0.6.255 | F |
| 10.0.7.255 | G |
| 10.0.8.255 | H |
| 10.0.9.255 | I |

The core server will begin discovery of alias domains by selecting one of the subnet representatives 111, 113, 115, 117, 119, 121, 123, 125, or 127. In this example, the core server 101 transmits a discovery message to the subnet representative 111. The subnet representative 111 searches locally for a job ID (an identifier for a transmission job) indicated in the discovery message, but does not find it. Since the subnet representative 111 does not find the job locally, the subnet representative 111 multicasts a notification message. The notification message indicates the job ID and an address for the subnet A 110. The notification message is transmitted throughout the subnet A 110 and to the switch 105. The switch 105 forwards the notification message to the subnets B 112 and C 114. In this example, subnet B 112 and subnet C 114 have visibility of messages from the subnet representative 111 (i.e., subnet B 112 and subnet C 114 can receive multicast data from the subnet representative 111). All network elements in subnet A 110, B 112 and C 114 receive the notification message and store the job ID and the address indicated in the notification message. Hence, the subnet representatives 113 and 115 will have the address of subnet A 110 and the job ID locally. The switch 105 also transmits the notification message to the router 103, but the router 103 does not forward the notification message.

The core server 101 transmits a discovery message to the subnet representative 117. The subnet representative 117 does not find the job ID of the discovery message locally and multicasts a notification message. The notification message, indicating the job ID and the address for the subnet D 116, is transmitted throughout subnet D 116 and to the switch 107. In this example, subnet E 118 and subnet F 120 have visibility of messages from the subnet representative 117. The switch 107 forwards the notification message to the subnets E 118 and F 120. All machines within the subnet E 118 and the subnet F 120, including the subnet representatives 119 and 121, store the subnet address of subnet D 116 and the job ID locally. The switch 107 also forwards the notification message to the router 103, but the router does not forward the notification message. The subnet representative 117 transmits a response to the core server 101 indicating that the subnet representative 117 does not indicate an alias domain (i.e., the subnet representative is unaware of a domain representative).

The core server 101 transmits a discovery message to the subnet representative 113. The subnet representative 113 has the job ID indicated in the discovery message stored locally from the notification message that was transmitted from the subnet representative 111. The subnet representative 113 transmits a response to the core server 101 indicating the alias domain as subnet A 110. After receiving the response from the subnet representative 113, the core server 101 transmits a discovery message addressed to the subnet representative 115. Since the subnet representative 115 also has the job ID indicated in the discovery message stored locally from the notification message that was transmitted from the subnet representative 111. The subnet representative 115 transmits a response to the core server 101 also indicating the alias domain as subnet A.

The core server 101 continues transmitting the discovery message serially to each subnet representative 119, 121, 123, 125, 127 until transmitting to the last one. After receiving a response from a subnet representative, the core server 101 transmits a discovery message to the next subnet representative. In FIG. 1A, the example illustrated assumes that the subnet representative 117 becomes the domain representative for the subnet E 118 and the subnet F 120. The example of FIG. 1A also assumes that the subnet representative 123 becomes the domain representative for the subnet 122, the subnet 124, and the subnet 126. In the example illustrated in FIG. 1A, The subnet D 116, the subnet E 118, and the subnet F, 120 are established as a single alias domain D. Also, the subnet G 122, the subnet H 124, and the subnet I 126 are established as an alias domain G.

Figure 1B:
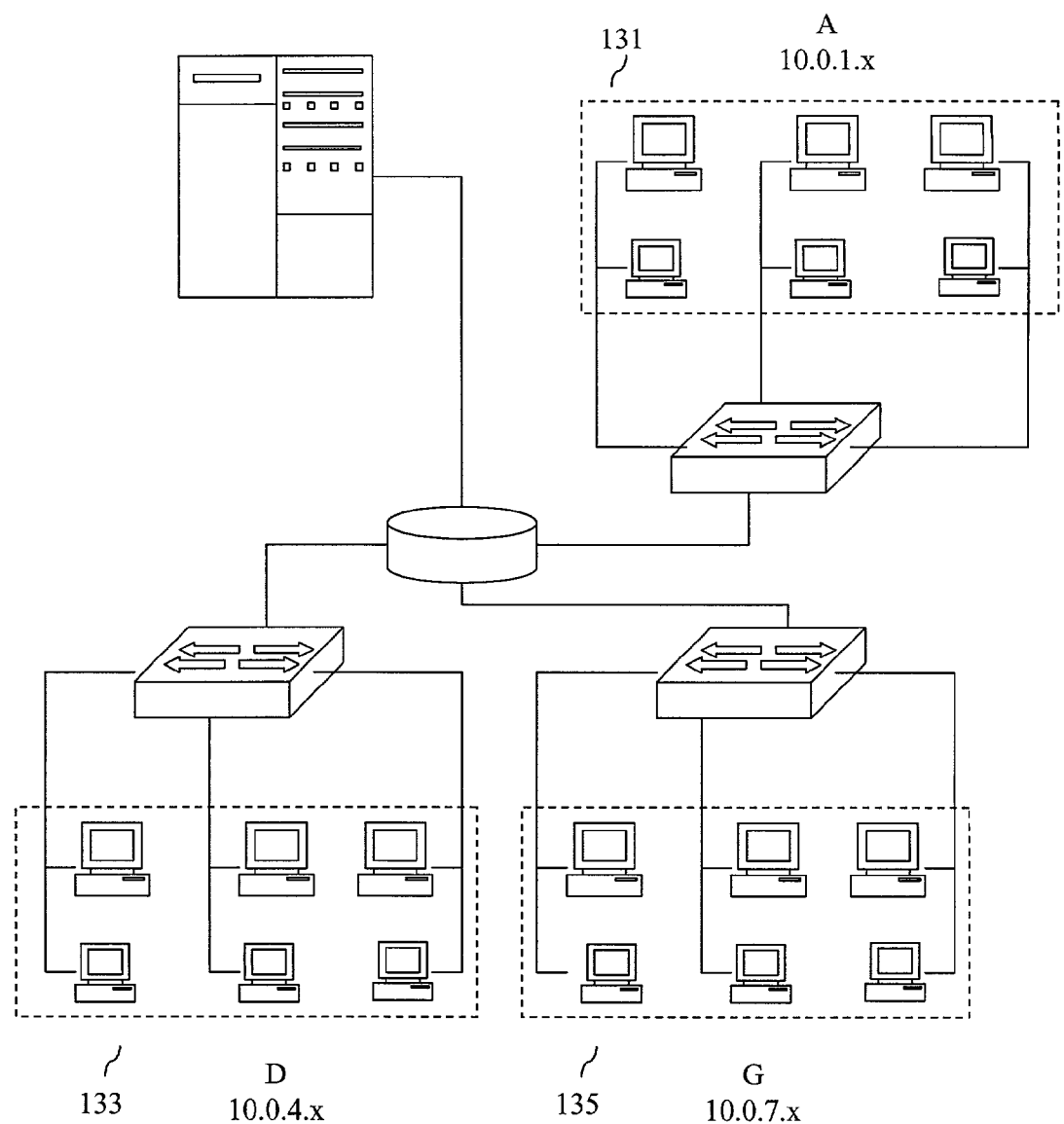
FIG. 1B is an exemplary diagram illustrating the alias domains established in FIG. 1A according to one embodiment of the invention.

FIG. 1B is an exemplary diagram illustrating the alias domains established in FIG. 1A according to one embodiment of the invention. Once the discovery process has ended and the core server 101 has received responses from all the subnet representatives, the core server establishes the alias domains as indicated in Table 2. An alias domain 131 includes subnet A 110, subnet B 112, and subnet C 114. An alias domain 133 includes the subnet D 116, the subnet E 118, and the subnet F 120. An alias domain 135 includes the subnet G 122, the subnet H 124, and the subnet I 126.

TABLE 2

| ALIAS DOMAIN | SUBNETS |
| --- | --- |
| 10.0.1.255 (A) | 10.0.1.255 (A), 10.0.2.255 (B), 10.0.3.255 (C) |
| 10.0.4.255 (D) | 10.0.4.255 (D), 10.0.5.255 (E), 10.0.6.255 (F) |
| 10.0.7.255 (G) | 10.0.7.255 (G), 10.0.8.255 (H), 10.0.8.255 (I) |

Figure 2:
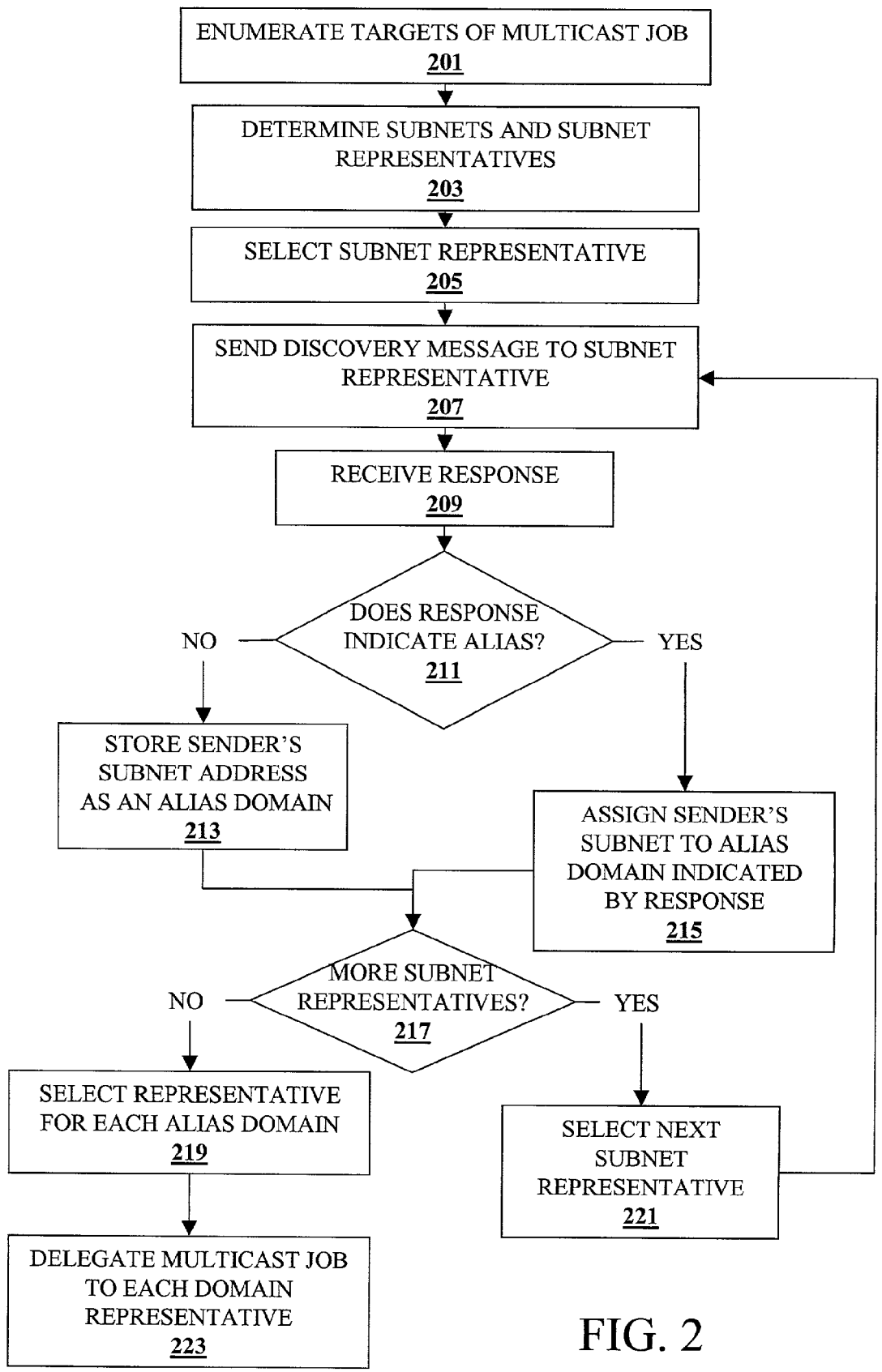
FIG. 2 is a flow chart for dynamically establishing various domains according to one embodiment of the invention.

FIG. 2 is a flow chart for dynamically establishing various domains according to one embodiment of the invention. At block 201, targets of a multicast job are enumerated. At block 203, a core server determines the targets' subnets and their subnet representatives At block 205, the core server selects one of the subnet representatives. At block 207, a discovery message is sent to the selected subnet representative. At block 209, the response to the discovery message is received by the core server. It is determined at block 211 if the response indicates an alias domain. If the response does not indicate an alias domain, then at block 213 the address corresponding to the subnet of the subnet representative is stored as an alias domain. If it is determined at block 211 that the response indicates an alias domain, then at block 215 the subnet corresponding to the subnet representative is assigned to the indicated alias domain. At block 217 it is determined if there are any other subnets . If there are additional subnets, then at block 221 the representative for the next subnet is selected. From block 221 control flows to block 207. If there are no more subnets, then at block 219 a domain representative is selected for each alias domain. At block 223, the multicast job is delegated to each domain representative. In one embodiment of the invention, blocks 219 and 223 are performed in parallel. In another embodiment of the invention, blocks 219 and 223 are individually performed in parallel.

In one embodiment of the invention, domain representatives are determined by the network administrator. In another embodiment of the invention, the addresses for each potential domain representative are ordered and either the network element with the lowest or highest address is selected as the domain representative. In another embodiment of the invention, domain representatives are selected from subnet representatives that have the file data to be transmitted to the targets. In another embodiment of the invention, the first subnet representative in an alias domain to respond to the discovery message is selected as the domain representative. In another embodiment of the invention, the core server selects one of the network elements contacted during the discovery process as a domain representative. In another embodiment of the invention, the core server compiles a list of multicast targets for each subnet as potential domain representatives.

Figure 3:
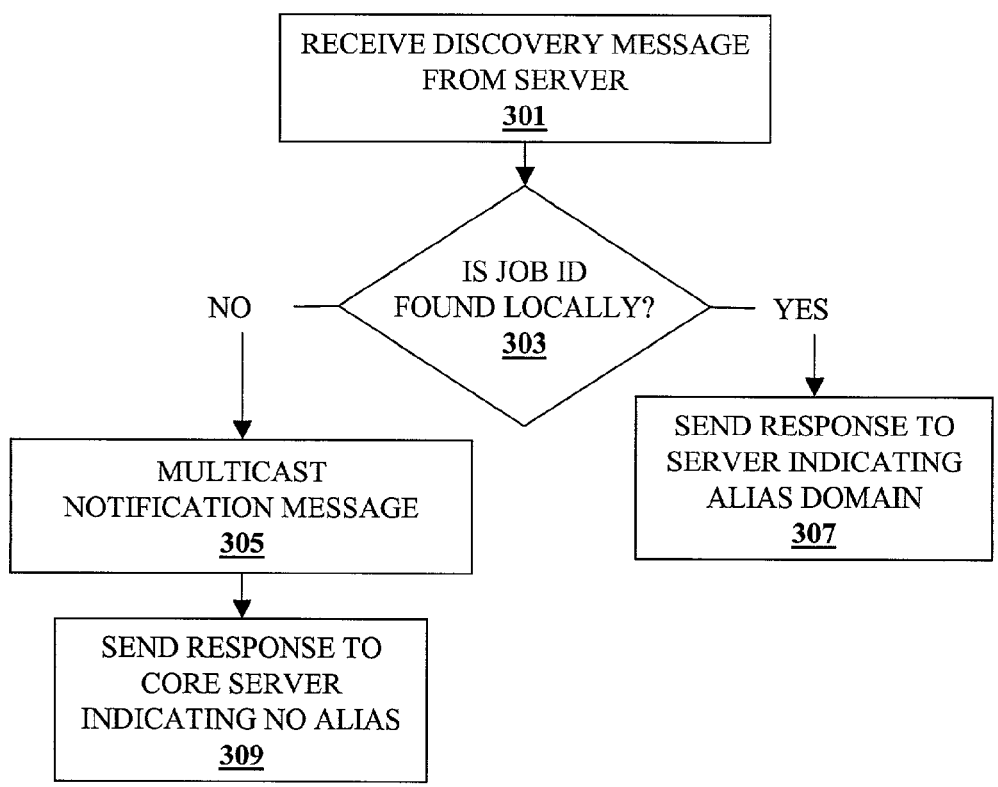
FIG. 3 is a flow chart for processing a discovery message according to one embodiment of the invention.

FIG. 3 is a flow chart for processing a discovery message according to one embodiment of the invention. At block 301 a subnet representative receives a discovery message from the core server. At block 303 it is determined if a job ID indicated in the discovery message is found locally. If the job ID is found locally, then at block 307 a response is sent to the core server indicating an alias domain. If the job ID is not found locally, then at block 305 the subnet representative multicasts a notification message. At block 309, the subnet representative sends a response to the discovery message to the core server not indicating an alias domain.

In one embodiment of the invention, the discovery message transmitted by the core server includes information about the file data (e.g., file size, file data, name of file data, etc.). In such an embodiment of the invention, a subnet representative can include a query about the file data with the information in a notification message. All network elements receiving the query could respond to the notifying subnet representative and indicate the amount of the file data stored locally on the responding network element. In a response transmitted by the notifying subnet representative to the core server, the notifying subnet representative can identify the network element(s) having some amount of the file data. In another embodiment of the invention, the notifying subnet representative identifies a predefined number of the network elements having some amount of the file data. In another embodiment of the invention, the notifying subnet representative identifies network elements having an amount of the file data exceeding a bottom limit.

Figure 4:
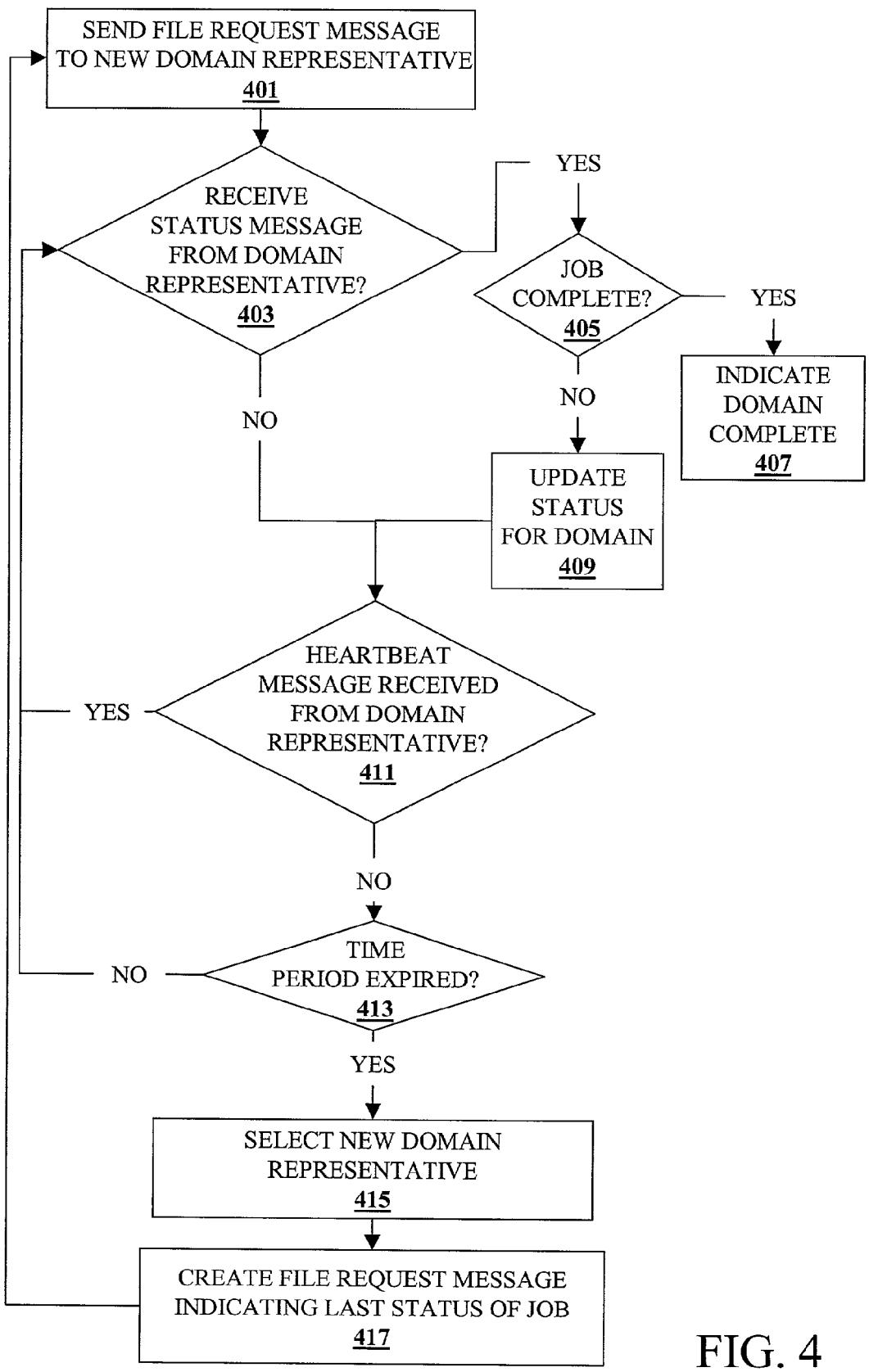
FIG. 4 is a flowchart for the core server managing the transmission job according to one embodiment of the invention.

FIG. 4 is a flowchart for the core server managing the transmission job for an alias domain according to one embodiment of the invention. At block 401, the core server 101 sends a file request message to a domain representative. Referring to FIG. 1A, the core server 101 can select any one of the subnet representatives 111, 113, or 115, as the domain representative for alias domain A 131 shown in FIG. 1B. At block 403, the core server 101 determines if a status message has been received from the domain representative. If a status message has been received from the domain representative, then at block 405 it determines if the transmission job has been completed by the domain representative. If the job has been completed by the domain representative, then at block 407 the core server 101 indicates that the transmission job has been completed for the given alias domain. If it is determined at block 405 that the transmission job has not been completed, then at block 409 the core server 101 updates the status of the alias domain. From block 409 control flows to block 411. If at block 403 the core server 101 determines that the a status message has not been received from the domain representative, then at block 411 the core server 101 determines if a heartbeat message has been received from the domain representative. If the core server 101 has received a heartbeat message from the domain representative then control flows back to block 403. If the core server 101 has not received a heartbeat message from the domain representative then at block 413 it is determined if a time period for receiving heartbeat messages has expired. If the given time period has not expired, then control flows back to block 403. If the time period has expired, then at block 415 the core server 101 selects a new domain representative. At block 417, the core server 101 creates a file request message indicating the last status of the incomplete transmission job. From block 417 control flows to block 401.

Figure 5:
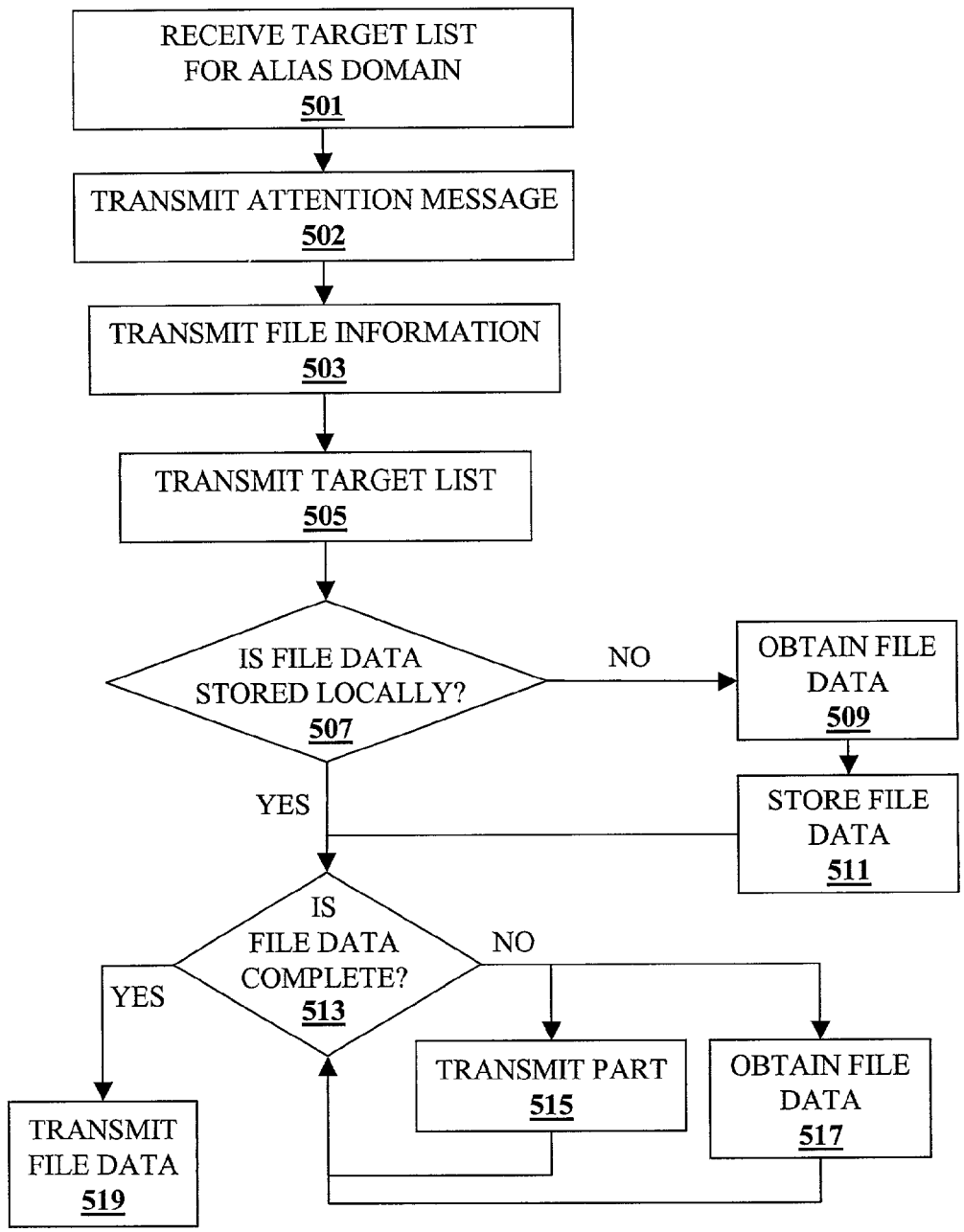
FIG. 5 is a flow chart for a domain representative communicating with a target to perform a transmission job according to one embodiment of the invention.

FIG. 5 is a flow chart for a domain representative communicating with a target to perform a transmission job according to one embodiment of the invention. At block 501, the domain representative receives a target list for its alias domain. At block 502, the domain representative transmits attention messages throughout its alias domain. At block 503, the domain representative transmits information about the transmission job throughout its alias domain. At block 505, the domain representative transmits the target list throughout its domain. Assuming the subnet representative 111 is chosen as the domain representative for the alias domain A 131, then the subnet representative 111 would transmit the attention messages, transmission job information, and target list throughout subnets A 110, subnet B 112, and subnet C 114. In alternative embodiments, the target list will be broken into multiple target lists. At block 507, the domain representative determines if the data to be transmitted is stored locally. Referring to the described example for alias domain A 131, the subnet representative 111 would search for the file data at some specific location or throughout its system (e.g., hard disk, cache, RAM, etc.). If the data is not stored locally, then at block 509 the domain representative obtains the file data from a source. The file data can be obtained from a filer server, http server, the core server, etc., as indicated by the file request message. At block 511 the domain representative stores the file data. From block 511, control flows to block 513. If it is determined at block 507 that the file data is stored locally, then at block 513 the domain representative determines if the file data stored locally is complete. If the file data stored locally is complete, then the domain representative begins to transmit the file data at block 519. In one embodiment of the invention, the domain representative reads segments of the file data into memory for transmission. If the locally stored file data is not complete, then the domain representative simultaneously obtains the remaining data from the source at block 517 and transmits the locally stored segment of the file data at block 515. From blocks 515 and 517, control flows back to block 513.

Figure 6:
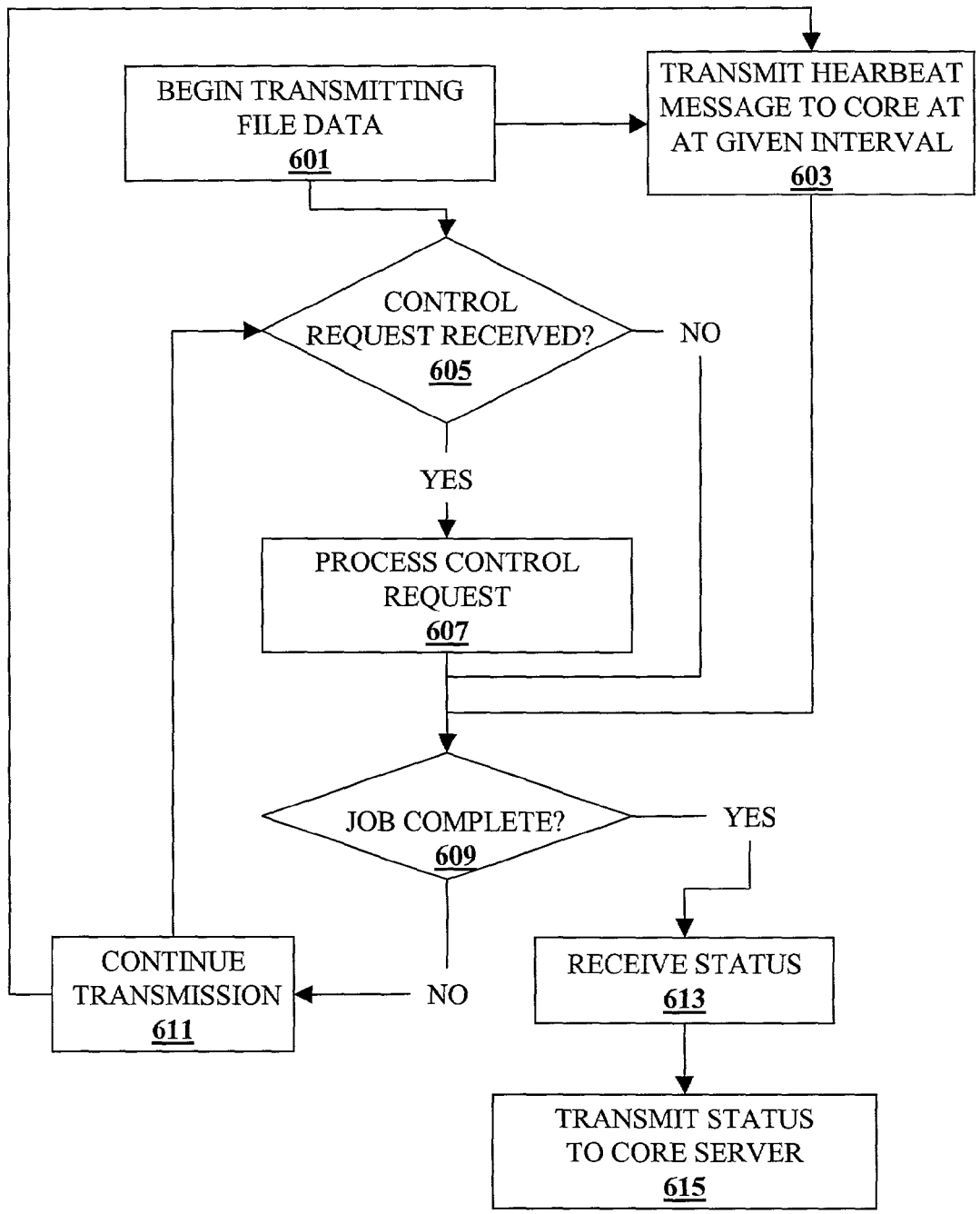
FIG. 6 is a flowchart for a domain representative to perform a transmission job according to one embodiment of the invention.

FIG. 6 is a flowchart for a domain representative to perform a transmission job according to one embodiment of the invention. At block 601, the domain representative begins transmitting the file data. At block 603, while the domain representative is transmitting the file data it also transmits a heartbeat message at given intervals to the core server 101. Again using the same example of subnet representative 111 being the domain representative of alias domain A 131, the subnet representative 111 transmits the data for the transmission job through the alias domain A 131 and transmits heartbeat messages to the core server 101 at given intervals. A domain representative for the other alias domains 133 and 135 will do the same as the subnet representative 111. From block 601, control flows to block 605. At block 605 it is determined if a control request has been received from a target. If a control request has not been received from a target, then at block 609 it is determined if the transmission job is complete. If a control request has been received, then at block 607 the domain representative processes the control request. From block 607 control flows to block 609. If it is determined at block 609 that the job has not been completed, then at block 611 the domain representative continues transmitting the file data. From block 611 control flows to block 603. From block 603 control flows to block 609. If it is determined at block 609 that the job has been completed, then at block 613 the domain representative receives a status message from each target. At block 615, each status message received from the target is transmitted to the core server 101. In the described example of alias domain A 131, its domain representative, assumed to be the subnet representative 111, will forward any status message from targets in the alias domain 131 to the core server 101.

Figure 7:
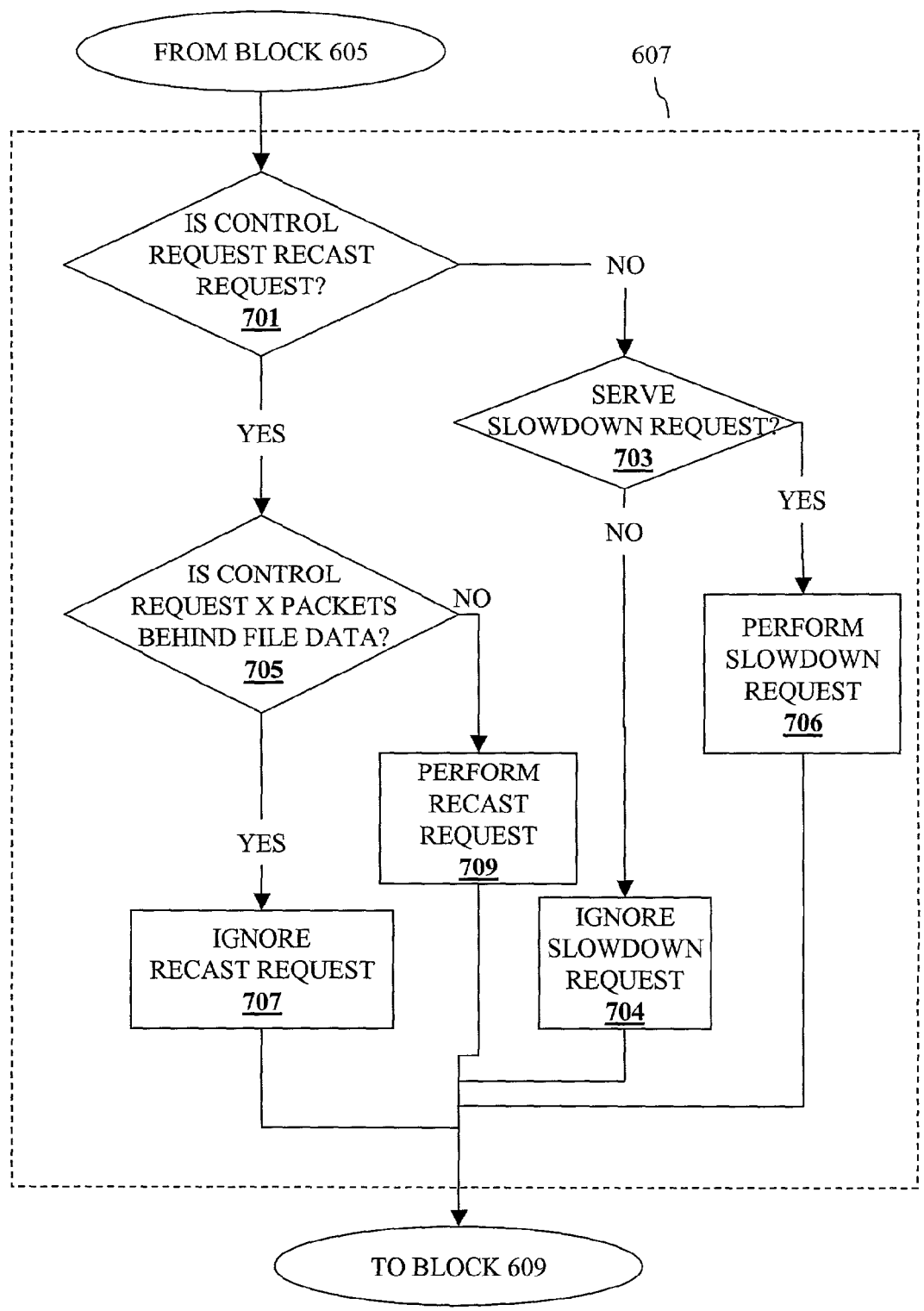
FIG. 7 is a flow chart for the domain representative to process a control request according to one embodiment of the invention.

FIG. 7 is a flow chart for the domain representative to process a control request according to one embodiment of the invention. From block 605 of FIG. 6, control flows to block 701. At block 701 it is determined if the control request is a recast request. If the control request is not a recast request, then at block 703 the domain representative determines whether or not to serve the slowdown request from the target. The domain representative makes a determination of whether serving the request is best for its alias domain based on the number of requests received from the requesting target during the current transmission job. If the domain representative determines that serving the slowdown request will not impact the alias domain negatively, then at block 706 the domain representative performs the slowdown request. If the domain representative determines that serving the slowdown request is not best for the alias domain, then at block 704 the domain representative ignores the slowdown request.

In one embodiment of the invention, the domain representative makes a determination to serve a slowdown request by tracking the number of slowdown requests received from each target in its alias domain during a transmission job. If the number of slowdown requests exceed a predefined threshold, then the request is ignored. In another embodiment of the invention, priority values are assigned to each network element in a network. In such an embodiment, the domain representative determines whether or not to serve a slowdown request based on the priority value, or a combination of the priority value and the number of requests received from the target. In another embodiment, multiple parameters indicating characteristics such as link speed, congestion, time of day, type of data being transmitted, etc., are used to determine whether or not to serve a slowdown request.

If it is determined at block 701 that the control request is a recast request, then at block 703 it is determined if the control request is x packets behind the file data (x being a number that can be determined by a network administrator). If the recast request is x packets behind the file data, then the recast request is ignored at block 707. If the control request is not x packets behind the file data, then the recast request is performed at block 709. In another embodiment of the invention, the core server will not serve a recast request if n recast requests have been received for the requested data (n being a number that can be determined by a network administrator or determined by an optimization program).

Figure 8:
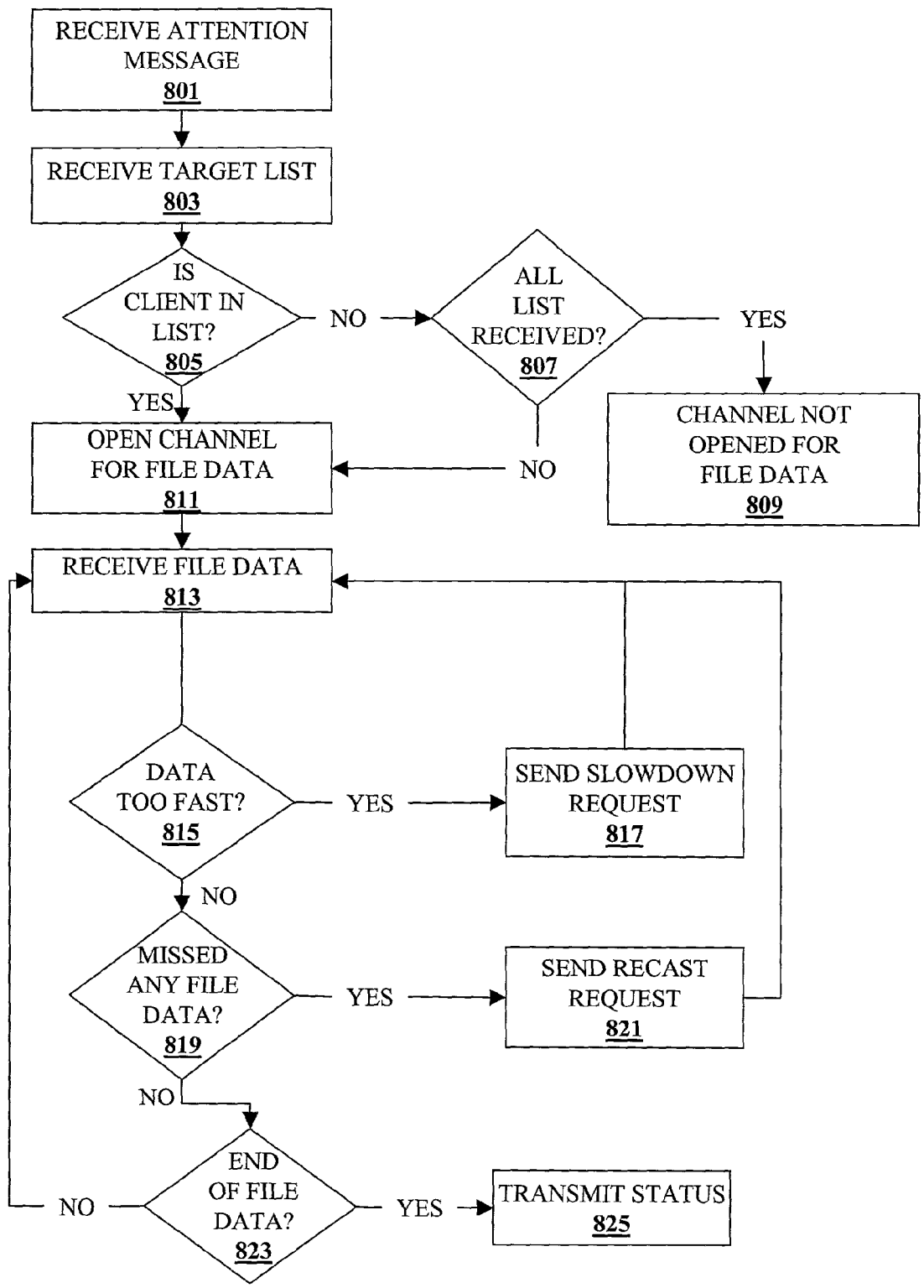
FIG. 8 is a flowchart for a client to process a transmission job according to one embodiment of the invention.

FIG. 8 is a flowchart for a client to process a transmission job according to one embodiment of the invention. At block 801, the client receives an attention message from a domain representative. At block 803, the client receives a target list from the domain representative. At block 805, the client determines if it is in the target list. If the client is not in the target list, then at block 807 the client determines if the entire target list has been received. If the entire target list has been received, the target does not open a channel for the file data at block 809. If at block 807 it is determined that the entire target list has not been received, then the client opens a channel for the file data at block 811. In an alternative embodiment of the invention, the client does not open a channel for the data unless it receives a target list indicating the client as a target. If data has been missed while waiting for the target list, then the client can transmit a recast request. If at block 805, the client determines that it is in the target list, then control flows to block 811. At block 813, the client receives file data. At block 815, the client determines if the file data is being transmitted too fast for it to process. If the file data is being transmitted too fast for it to process, then at block 817 the client transmits a slowdown request to the domain representative. From block 817 control flows back to block 813. If it is determined at block 815 that the data is not being transmitted too fast, then at block 819 the client determines if it has missed any file data. If the client has missed file data, then at block 821 the client transmits a recast request to the domain representative. From block 821, control flows back to block 813. If at block 819, the client determines that it has not missed any file data, then at block 823 the client determines if it has received the end of the file data. If the client has not received the end of the file data, then control flows back to block 813. If the client has received the end of the file data, then at block 825 the client transmits a status indicating completion of the transmission job.

Dynamically establishing alias domain increases efficiency of managing an enterprise network and enhances subnet directed multicast technology. The described invention also reduces inefficient use of bandwidth.

While the invention has been described in terms of several embodiments, those skilled in the art will recognize that the invention is not limited to the embodiments described. The invention can also be used in environments in which some of the routers support routing multicast data. In such an environment, the invention enables determination of which groups of subnets a single multicast can contact. In another embodiment of the invention, hop limited alias domains are established. A limited alias domain is a set of network elements that can be reached in a given number of network hops.

Figure 9:
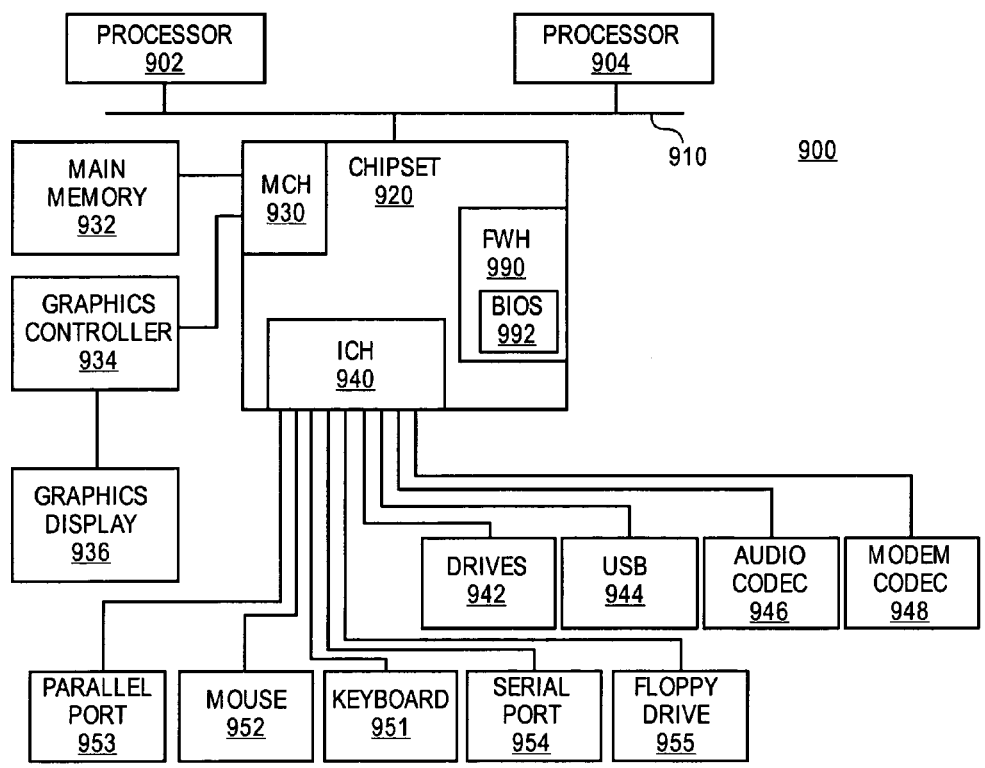
FIG. 9 illustrates a computer system that includes a machine-readable medium on which is stored a set of instructions according to embodiments of the present invention.

FIG. 9 illustrates a computer system that includes a machine-readable medium on which is stored a set of instructions according to embodiments of the present invention. Although described in the context of computer system 900, the present invention may be implemented in any suitable computer system comprising any suitable one or more integrated circuits.

As illustrated in FIG. 9, computer system 900 comprises processor 902 that may include instructions for dynamically establishing alias domains, as described herein. Computer system 900 also can include another processor 904 that may also have instructions for dynamically establishing alias domains, as described herein. Computer system 900 also includes processor bus 910, and chipset 920. Processors 902 and 904 and chipset 920 are coupled to processor bus 910. Processors 902 and 904 may each comprise any suitable processor architecture and for one embodiment comprise an Intel® Architecture used, for example, in the Pentium® family of processors available from Intel® Corporation of Santa Clara, Calif. Computer system 900 for other embodiments may comprise one, three, or more processors any of which may execute a set of instructions that are in accordance with embodiments of the present invention.

Chipset 920 for one embodiment comprises memory controller hub (MCH) 930, input/output (I/O) controller hub (ICH) 940, and firmware hub (FWH) 990. MCH 930, ICH 940, and FWH 990 may each comprise any suitable circuitry and for one embodiment is each formed as a separate integrated circuit chip. Chipset 920 for other embodiments may comprise any suitable one or more integrated circuit devices.

MCH 930 may comprise any suitable interface controllers to provide for any suitable communication link to processor bus 910 and/or to any suitable device or component in communication with MCH 930. MCH 930 for one embodiment provides suitable arbitration, buffering, and coherency management for each interface.

MCH 930 is coupled to processor bus 910 and provides an interface to processors 902 and 904 over processor bus 910. Processor 902 and/or processor 904 may alternatively be combined with MCH 930 to form a single chip. MCH 930 for one embodiment also provides an interface to a main memory 932 and a graphics controller 934 each coupled to MCH 930. Main memory 932 stores data and/or instructions, for example, for computer system 900 and may comprise any suitable memory, such as a dynamic random access memory (DRAM) for example. Graphics controller 934 controls the display of information on a suitable display 936, such as a cathode ray tube (CRT) or liquid crystal display (LCD) for example, coupled to graphics controller 934. MCH 930 for one embodiment interfaces with graphics controller 934 through an accelerated graphics port (AGP). Graphics controller 934 for one embodiment may alternatively be combined with MCH 930 to form a single chip.

MCH 930 is also coupled to ICH 940 to provide access to ICH 940 through a hub interface. ICH 940 provides an interface to I/O devices or peripheral components for computer system 900. ICH 940 may comprise any suitable interface controllers to provide for any suitable communication link to MCH 930 and/or to any suitable device or component in communication with ICH 940. ICH 940 for one embodiment provides suitable arbitration and buffering for each interface.

For one embodiment, ICH 940 provides an interface to one or more suitable integrated drive electronics (IDE) drives 942, such as a hard disk drive (HDD) or compact disc read only memory (CD ROM) drive for example, to store data and/or instructions for example, one or more suitable universal serial bus (USB) devices through one or more USB ports 944, an audio coder/decoder (codec) 946, and a modem codec 948. ICH 940 for one embodiment also provides an interface through a super I/O controller (not shown) to a keyboard 951, a mouse 952, one or more suitable devices, such as a printer for example, through one or more parallel ports 953, one or more suitable devices through one or more serial ports 954, and a floppy disk drive 955. Though not shown, ICH 940 for one embodiment further provides an interface to one or more suitable peripheral component interconnect (PCI) devices coupled to ICH 940 through one or more PCI slots on a PCI bus and an interface to one or more suitable industry standard architecture (ISA) devices coupled to ICH 940 by the PCI bus through an ISA bridge. ISA bridge interfaces with one or more ISA devices through one or more ISA slots on an ISA bus.

ICH 940 is also coupled to FWH 990 to provide an interface to FWH 990. FWH 990 may comprise any suitable interface controller to provide for any suitable communication link to ICH 940. FWH 990 for one embodiment may share at least a portion of the interface between ICH 940 and super I/O controller (not shown). FWH 990 comprises a basic input/output system (BIOS) memory 992 to store suitable system and/or video BIOS software. BIOS memory 992 may comprise any suitable non-volatile memory, such as a flash memory for example.

Accordingly, computer system 900 includes a machine-readable medium on which is stored a set of instructions (i.e., software) embodying any one, or all, of the methodologies described above. For example, software can reside, completely or at least partially, within main memory 932 and/or within processors 902/904. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

The method and apparatus of the invention can be practiced with modification and alteration within the spirit and scope of the appended claims. The description is thus to be regarded as illustrative instead of limiting on the invention.

We claim:

1. In a network environment having a server connected to a router which does not forward multicast traffic, the router connected to a plurality of switches, each switch connected to a plurality of subnets and to forward multicast traffic, a method for automatically establishing a discovered set of subnets as an alias domain comprising the following operations performed by the server:

discovering a set of subnets from amongst all of the subnets that are connected to the plurality of switches, the set of subnets having visibility of a broadcast or multicast transmission;

selecting a network element to perform the broadcast or multicast transmission, the network element being in one subnet of the set of subnets;

sending a transmission job identifier to the network element, wherein the broadcast or multicast transmission to be performed by the network element will include said identifier and the address of said one subnet of the set of subnets; and receiving an indication from the network element that it is aware of an alias domain representative being in another one subnet of the set of subnets.

2. The method of daim 1 wherein the transmission is a multicast transmission.

3. The method of claim 1 wherein the selecting the network element comprises determining the network element to have a set of data to be transmitted for the transmission.

4. The method of claim 1 further comprising maintaining a state of the transmission for each member of each of the set of subnets.

5. A method comprising:

enumerating a set of subnets in which network elements will be targets of a multicast or broadcast job; and establishing the set of subnets as an alias domain, by a core server automatically a) sending a discovery message to a subnet representative of each subnet of the set of subnets, wherein the discovery message contains an identifier for the multicast or broadcast job, b) evaluating a response from a sender being a first subnet representative c) where the response indicates that the sender's subnet has an alias, then assigning the sender's subnet to a domain indicated by the response, and d)

where the response indicates that the sender's subnet has no alias, then storing the sender's subnet address as a domain; and where the sender's subnet has no alias, the first subnet representative broadcasts or multicasts a notification message which includes the identifier and an address for the first subnet.

6. The method of claim 5 wherein the notification message is forwarded by a switch to one or more subnets of the set of subnets other than the sender's subnet.

7. The method of claim 6 wherein the notification message is received by network elements in said one or more subnets of the subnets other than the sender'subnet, and the network elements store the identifier and the address that are included in the message.

8. The method of claim 7 further comprising:
the core server sending another discovery message to a second subnet representative of a second subnet, wherein the second subnet representative has the identifier stored locally that was received via the notification message that came from the first subnet representative, the second subnet representative to transmit a response to the core server indicating that its subnet has an alias, namely the first subnet.

9. The method of claim 5 wherein the alias domain is a multicast domain, the method further comprising selecting a domain representative for the alias domain and delegating a multicast job to the domain representative.

10. A method for automatically establishing a set of subnets as an alias domain comprising:
transmitting by a core server a discovery message to each of a number of representatives of subnets in a network, the discovery message including the same transmission job identifier;
receiving by the core server responses to the discovery messages from the number of representatives of the subnets wherein the response from each representative indicates whether or not the transmission job identifier is stored locally;
creating a number of alias domains in the network based on the responses to the discovery messages, wherein if a response from a sender indicates the identifier is stored locally then the sender's subnet is assigned to an alias domain indicated in the response, and if the response indicates the identifier is not stored locally, then the sender's subnet is assigned to an alias domain;
for each alias domain in the network, assigning one of the number of representatives of the subnets whose subnet is part of the alias domain as the domain representative.

11. The method of claim 10 wherein assigning one of the number of representatives of the subnets whose subnet is part of the alias domain as the domain representative comprises:
ordering a set of network addresses; and
selecting one of the set of network addresses, the one of the set of network addresses corresponding to the one of the number of representatives of the subnets.

12. The method of claim 10 wherein assigning one of the number of representatives of the subnets whose subnet is part of the alias domain as the domain representative comprises:
indicating a preference value for each of the number of representatives; and
determining that the one of the number of representatives has the most desired preference value of the number of representatives.

13. The method of claim 10 wherein assigning one of the number of representatives of the subnets whose subnet is part of the alias domain as the domain representative includes determining that the one of the number of representatives of the subnets has a set of data to be transmitted throughout the network.

14. A machine-readable medium that provides instructions, which when executed by a server, cause said server to perform operations comprising:
determining a set of subnets to receive a set of data, wherein the set of subnets have visibility of a multicast transmission;
dynamically establishing the set of subnets as an alias domain by sending to a representative in each subnet of the set of subnets a message that includes the same multicast job identifier and receiving a response that indicates whether or not the identifier has been previously received by the representative;
selecting a representative for the alias domain; and
indicating to the selected representative to transmit the set of data.

15. The machine-readable medium of claim 14 wherein the selecting the representative comprises:
ordering a set of network addresses; and
selecting one of the set of network addresses, the one corresponding to the representative.

16. The machine-readable medium of claim 14 wherein the selecting the representative comprises:
indicating a preference value for at least one network element in each subnet of the set of subnets; and
determining that the representative has the most desired preference value in the set of subnets.

17. The machine-readable medium of claim 14 wherein the selecting the representative comprises determining that the representative has the set of data to be transmitted.

18. The machine-readable medium of claim 14 further comprising instructions, which when executed maintain a status of transmission of the set of data.

19. The machine-readable medium of claim 14 further comprising instructions, which when executed:
determine the status of transmission of the set of data to be incomplete; and
select a second representative to complete transmission of the set of data.

20. A machine-readable medium that provides instructions, which when executed by a machine, cause said machine to perform operations for establishing automatically a set of subnets as an alias domain, comprising:
receiving a first message from a server indicating a broadcast or multicast transmission job identifier;
determining if the machine is in a domain for the transmission job by checking a cache in the machine for the identifier;
if the machine is not in the domain for the transmission job, then transmitting a second message to the server indicating the machine's subnet and adding the identifier to the cache; and
if the machine is in the domain for the transmission job, then transmitting a second message to the server indicating the domain.

21. The machine-readable medium of claim 20 further comprising instructions, which when executed by the machine, cause said machine to perform operations further comprising:
when the machine is selected as a domain representative, receiving an indication of a source of a set of data for the transmission job; accessing the set of data;

receiving an indication of a set of targets for the set of data;

notifying the targets of the transmission job;

transmitting the set of data to the set of targets; and transmitting an indication of a status of the transmission job to a server.

22. The machine-readable medium of claim 20 further comprising insfructions, which when executed by the machine, cause said machine to perform operations further comprising:

when the machine is not selected as a domain representative, receiving a notification of the transmission job;

determining if the machine is one of a set of targets for the transmission job;

listening for a set of data of the transmission job; and notifying a network element when the set of data has been received, the network element having transmitted the set of data.

23. The machine-readable medium of claim 20 further comprising instructions, which when executed by the machine, cause said machine to perform operations further comprising:

receiving a set of data of the transmission job;

indicating to a transmitting network element to modify a rate at which the set of data is being transferred if the rate is too slow or too fast for the machine; and indicating to the transmitting network element to retransmit a subset of the set of data if the subset was missed.

* * * * *

UNITED STATES PATENT AND TRADEMARK OFFICE
CERTIFICATE OF CORRECTION

PATENT NO. : 7,193,974 B2  Page 1 of 1
APPLICATION NO. : 09/927708
DATED : March 20, 2007
INVENTOR(S) : Eatough et al.

It is certified that error appears in the above-identified patent and that said Letters Patent is hereby corrected as shown below:

In column 11, at line 13, delete "sender'subnet" and insert --sender's subnet--.

In column 13, at line 8, delete "insfructions" and insert --instructions--.

Signed and Sealed this

Twenty Second Day of April, 2008

JON W. DUDAS
*Director of the United States Patent and Trademark Office*